(12) United States Patent
Wu et al.

(10) Patent No.: US 8,097,320 B2
(45) Date of Patent: *Jan. 17, 2012

(54) GLYCOLURIL RESIN AND ACRYLIC RESIN DUAL MEMBERS

(75) Inventors: Jin Wu, Pittsford, NY (US); Jonathan H Herko, Walworth, NY (US); Scott J Griffin, Fairport, NY (US); Michael S Roetker, Webster, NY (US); Dante M Pietrantoni, Rochester, NY (US); David W Martin, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/550,492

(22) Filed: Aug. 31, 2009

(65) Prior Publication Data

US 2011/0053070 A1    Mar. 3, 2011

(51) Int. Cl.
| B32B 1/00 | (2006.01) |
| B32B 27/08 | (2006.01) |
| B32B 27/20 | (2006.01) |
| B32B 27/30 | (2006.01) |
| B32B 27/34 | (2006.01) |
| B32B 27/36 | (2006.01) |
| G03G 15/16 | (2006.01) |

(52) U.S. Cl. ............. 428/36.91; 428/412; 428/421; 428/422; 428/473.5; 428/474.4; 428/480; 428/522; 399/308

(58) Field of Classification Search .............. None
See application file for complete search history.

(56) References Cited

U.S. PATENT DOCUMENTS

| 5,487,707 A | 1/1996 | Sharf et al. |
| 5,635,324 A * | 6/1997 | Rasmussen et al. ........ 430/58.8 |
| 6,318,223 B1 | 11/2001 | Yu et al. |
| 6,440,515 B1 | 8/2002 | Thornton et al. |
| 6,602,156 B2 | 8/2003 | Schlueter, Jr. |
| 7,031,647 B2 | 4/2006 | Mishra et al. |
| 7,130,569 B2 | 10/2006 | Goodman et al. |
| 7,139,519 B2 | 11/2006 | Darcy, III et al. |
| 2004/0221942 A1 * | 11/2004 | Yu et al. ................. 156/157 |
| 2007/0248813 A1 * | 10/2007 | Wu et al. ................. 428/337 |
| 2009/0050255 A1 | 2/2009 | Herko et al. |
| 2011/0052840 A1 | 3/2011 | Wu |
| 2011/0052854 A1 | 3/2011 | Wu et al. |

OTHER PUBLICATIONS

Jin Wu, U.S. Appl. No. 12/550,589 entitled Carbon Black Polymeric Intermediate Transfer Members, filed concurrently herewith.
Jin Wu et al., U.S. Appl. No. 12/550,486 entitled Glycoluril Resin and Acrylic Resin Members, filed concurrently herewith.
Jin Wu, U.S. Appl. No. 12/413,627 entitled Resin Mixture Backing Layer Containing Photoconductor, filed Mar. 30, 2009.
Jin Wu, U.S. Appl. No. 12/413,645 entitled Layered Intermediate Transfer Members, filed Mar. 30, 2009.
Jin Wu et al., U.S. Appl. No. 12/413,783 entitled Glycoluril Resin and Polyol Resin Members, filed Mar. 30, 2009.
Jin Wu et al., U.S. Appl. No. 12/413,795 entitled Glycoluril Resin and Polyol Resin Dual Members, filed Mar. 30, 2009.
Jin Wu et al., U.S. Appl. No. 12/200,147 entitled Coated Seamed Transfer Member, filed Aug. 28, 2008.
Jin Wu et al., U.S. Appl. No. 12/200,179 entitled Coated Transfer Member, filed Aug. 28, 2008.
Jin Wu, U.S. Appl. No. 12/129,995 on Polyimide Intermediate Transfer Components, filed May 30, 2008.
Jin Wu, U.S. Appl. No. 12/181,354, on Core Shell Intermediate Transfer Components, filed Jul. 29, 2008.
Jin Wu, U.S. Appl. No. 12/181,409 on Treated Carbon Black Intermediate Transfer Components, filed Jul. 29, 2008.

* cited by examiner

Primary Examiner — Ramsey Zacharia
(74) Attorney, Agent, or Firm — Oliff & Berridge, PLC

(57) ABSTRACT

A dual layered intermediate transfer member, such as a belt, that includes a substrate that is coated with a layer of a mixture of a glycoluril resin, and a self crosslinking acrylic resin.

24 Claims, No Drawings

GLYCOLURIL RESIN AND ACRYLIC RESIN DUAL MEMBERS

CROSS REFERENCE TO RELATED APPLICATIONS

Copending U.S. application Ser. No. 12/550,589, U.S. Publication No. 20110052840, filed Aug. 31, 2009, on Carbon Black Polymeric Intermediate Transfer Members, the disclosure of which is totally incorporated herein by reference, illustrates an intermediate transfer member comprised of a mixture of carbon black, a first copolymer comprised of a polyester, a polycarbonate and a polyalkylene glycol, and a second copolymer.

Copending U.S. application Ser No. 12/550,486, U.S. Publication No. 20110052854, filed Aug. 31, 2009, on Glycoluril Resin and Acrylic Resin Members, the disclosure of which is totally incorporated herein by reference, illustrates a process which comprises providing a flexible belt having at least one welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a resin mixture of a glycoluril resin and an acrylic resin.

Copending U.S. Application No. 12/413,627, U.S. Publication No. 20100248103, filed Mar. 30, 2009, entitled Resin Mixture Backing Layer Containing Photoconductor, the disclosure of which is totally incorporated herein by reference, illustrates a photoconductor comprising a substrate, an imaging layer thereon, and a backing layer located on a side of the substrate opposite the imaging layer wherein the outermost layer of the backing layer adjacent to the substrate is comprised of a glycoluril resin, and a polyol resin mixture.

U.S. application Ser. No. 12/413,645, now U.S. Pat. 7,910,183, filed Mar. 30, 2009, entitled Layered Intermediate Transfer Members, the disclosure of which is totally incorporated herein by reference, illustrates an intermediate transfer member comprised of a polyimide substrate, and thereover a polyetherimide/polysiloxane.

Illustrated in copending U.S. application Ser. No. 12/413,783, U.S. Publication No. 20100248107, filed Mar. 30, 2009, Glycoluril Resin and Polyol Resin Members, the disclosure of which is totally incorporated herein by reference, is an intermediate transfer member comprised of a seamed substrate, and wherein the seam is coated with a mixture of a glycoluril resin and a polyol resin.

Copending U.S. application Ser. No. 12/413,795, U.S. Publication No. 20100248108, filed Mar. 30, 2009, entitled Glycoluril Resin And Polyol Resin Dual Members, the disclosure of which is totally incorporated herein by reference, illustrates a process which comprises providing a flexible belt having at least one welded seam extending from one parallel edge to the other parallel edge of the coating, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and a polyol resin or polymer.

Illustrated in U.S. application Ser. No. 12/200,147, U.S. Publication No. 20100055328, filed Aug. 28, 2008, entitled Coated Seamed Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179, U.S. Publication No. 20100051171, filed Aug. 28, 2008, entitled Coated Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 11/895,255, filed Aug. 22, 2007, U.S. Publication No. 20090050255, the disclosure of which is totally incorporated here by reference, is a process for the post treatment of an ultrasonically welded seamed flexible imaging member belt comprising providing a flexible belt having a welded seam extending from one parallel edge to the other parallel edge, the welded seam having a rough seam region comprising an overlap of two opposite edges; positioning the flexible belt on a lower anvil such that the flexible belt is held in position on the lower anvil by vacuum; contacting the rough seam region with a heat and pressure applying tool; and smoothing out the rough seam region with heat and pressure applied by the heat and pressure applying tool to produce a flexible belt having a smooth welded seam without removing the seam material.

BACKGROUND

Disclosed are intermediate transfer members, and more specifically, coated seamed intermediate transfer members useful in transferring a developed image in an electrostatographic, for example xerographic, including digital, image on image, and the like, printers, machines or apparatuses. In embodiments, there are selected, for example, seamed intermediate transfer members comprised of a conductive supporting substrate material like carbon black, a polyaniline, or mixtures thereof dispersed in a polymer solution, such as a polyamic acid solution illustrated in copending applications U.S. application Ser. No. 12/129,995, U.S. application Ser. No. 12/181,354, and U.S. application Ser. No. 12/181,409, the disclosures of which are totally incorporated herein by reference; and thereafter, applying a crosslinked mixture of a glycoluril resin and a self crosslinking acrylic resin on the entire member substrate, inclusive of the reverse double welded seam. In embodiments, there is selected, for example, a dual layered transfer member, such as a two layered intermediate transfer member comprised of a supporting substrate like a polyimide, and thereafter, applying onto the entire substrate surface a crosslinked mixture of a glycoluril resin and a self crosslinking acrylic resin.

Intermediate transfer belts can be generated in the form of seamed belts fabricated by fastening two ends of a web material together, such as by welding, sewing, wiring, stapling, or gluing. While seamless intermediate transfer belts are known, they may require manufacturing processes that render them more costly as compared to similar seamed intermediate transfer belts.

Seamed belts can be fabricated from a sheet cut that originates from an imaging member web. The sheets are generally rectangular, or in the shape of a parallelogram where the seam does not form a right angle to the parallel sides of the sheet. All edges may be of the same length, or one pair of parallel edges may be longer than the other pair of parallel edges. The sheets are formed into a belt by joining overlapping opposite marginal end regions of the sheet. A seam is typically produced in the overlapping marginal end regions at the point of joining. Joining of the aforementioned areas may be effected by any suitable means, such as by welding like ultrasonic welding, gluing, taping, pressure heat fusing, and the like.

Ultrasonic welding can be accomplished by retaining in a down position the overlapped ends of a flexible imaging member sheet with a vacuum against a flat anvil surface, and guiding the flat end of an ultrasonic vibrating horn transversely across the width of the sheet, over and along the length of the overlapped ends, to form a welded seam. Ultrasonically welding results in an overlap seam that has an irregular surface topology rendering it difficult for a cleaning blade to remove toner around the seam, and such welding can also cause damage to the cleaning blades by nicking the cleaning edge of the blade. In addition, toner trapping resulting from the poor cleaning and the blade damage causes streaking from the seam and creates an image quality problem. Many post fabrication seam smoothing techniques, which remove material from the seam, may also degrade seam strength.

Also, when ultrasonically welded into a belt, the seam of a multilayered electrophotographic flexible imaging member belt may occasionally contain undesirable high protrusions such as peaks, ridges, spikes, and mounds. These seam protrusions present problems during image cycling of the belt because they interact with the cleaning blade causing blade wear and tear, which can affect cleaning blade efficiency, and reduce service life.

In a typical electrostatographic reproducing apparatus, a light image of an original to be copied is recorded in the form of an electrostatic latent image upon a photosensitive member or photoconductor, and the latent image is subsequently rendered visible by the application of electroscopic thermoplastic resin particles and colorant. Generally, the electrostatic latent image is developed by a developer mixture comprised of carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a support like paper. It is advantageous to transfer the developed image to a coated intermediate transfer web, belt or component, and subsequently transfer with very high transfer efficiency the developed image from the intermediate transfer member to a permanent substrate. The toner image is subsequently usually fixed or fused upon a support, which may be the photoconductor or other support such as plain paper.

In electrostatographic printing machines wherein the toner image is electrostatically transferred by a potential difference between the imaging member and the intermediate transfer member, the transfer of the toner particles to the intermediate transfer member, and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred. Intermediate transfer members allow for a number of advantages such as enabling high throughput at modest process speeds, improving registration of the final color toner image in color systems using synchronous development of one or more component colors using one or more transfer stations, and increasing the variety of final substrates that can be used.

More specifically, a bump, surface irregularity, or other discontinuity in the seam of the belt may disturb the tuck of the cleaning blade as it makes intimate contact with the photoconductive member surface to effect residual toner and debris removal. The increased height differential may allow toner to pass under the cleaning blade, and not be cleaned. Furthermore, seams having differential heights may, when subjected to repeated striking by cleaning blades, cause photoconductive member cycling speed disturbance which adversely affects the crucial photoconductive belt motion quality. Moreover, seams with a bump or any morphological defects can cause the untransferred residual toner to be trapped in the sites of the seam surface irregularities. The seam of a photoreceptor belt, which is repeatedly subjected to the striking action by a cleaning blade under machine functioning conditions, can trigger the development of premature seam delamination failure. In addition, the discontinuity in belt thickness due to the presence of an excessive seam height yields variances of mechanical strength in the belt and reduces the fatigue flex life of the seam when cycling over belt module support rollers. As a result, both the cleaning life of the blade, and the overall service life of the photoreceptor belt can be diminished.

Moreover, the protrusion high spots in the seam may also interfere with the operation of subsystems of copiers, printers, and duplicators by damaging electrode wires used in development that position the wires parallel to and closely spaced from the outer imaging surface of belt photoreceptors. These closely spaced wires are employed to facilitate the formation of a toner powder cloud at a development zone adjacent to a toner donor roll, and the imaging surface of the belt imaging member.

There is a need for a seamed member, such as a belt, that avoids or eliminates a number of the disadvantages mentioned herein, and more specifically, there is a need for an ITB with a coated seam or double welded seam surface topology such that it can withstand dynamic fatigue conditions, and where the seam or seams are of minimum visibility and possess excellent surface resistivities; where in embodiments a reverse double welded seam can be achieved without additional finishing steps, such as sanding; and where the coating layer is mechanically robust and electrically matches the surface resistivity of the seamed ITB, and adheres strongly to the ITB base layer. For example, the coated seam as disclosed herein provides a smoother surface with substantially decreased or eliminated profile protrusions or irregularities thereby extending its service life. There is also a need for a substantially completely imageable seam, which avoids or minimizes the disadvantages indicated herein by overcoating the seam with a conducting polymer mixture layer, and which layer is mechanically robust and electrically matches the surface resistivity of the seamed intermediate transfer belt (ITB), or intermediate transfer member, which resistivity is, for example, from about $10^9$ to about $10^{13}$ ohm/sq.

More specifically, there is a need for a seamed dual layered member, such as a belt, that avoids or eliminates a number of the disadvantages mentioned herein, and more specifically, there is a need for an ITB with excellent surface topology such that it can withstand dynamic fatigue conditions, and a need for further improving the transfer of an image, such as a xerographic image, from a member like an intermediate transfer member to a substrate like paper, and where there is added to the top overcoat layer a component that possesses slippery characteristics, such as a siloxane component or a fluoro component, each selected in an amount of from about 0.1 to about 5 weight percent. For example, the coated member as disclosed herein provides a smoother surface with substantially decreased or eliminated profile protrusions or irregularities thereby extending its service life. There is also a need for a substantially completely imageable seam, which avoids or minimizes the disadvantages indicated herein by overcoating the entire member inclusive of the seam or seams with a conductive polymer mixture layer, and which layer is mechanically robust.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and very costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor xerographic image quality.

SUMMARY

According to embodiments illustrated herein, there is provided a flexible intermediate transfer member, such as a belt (ITB), that has excellent surface topology of its welded overlap seam while maintaining seam strength, and processes for the preparation of flexible belts.

In embodiments, there is disclosed a process for the treatment, especially post treatment of an ultrasonically welded seamed flexible imaging member belt comprising providing a flexible belt with a supporting substrate having at least one, such as one or two welded seams extending from one parallel edge to the other parallel edge of the belt, the welded seam or seams having a rough seam region comprising an overlap of two opposite edges; positioning the flexible belt on a lower anvil such that the flexible belt is held in position on the lower anvil by a vacuum; contacting the belt and the rough seam region with a heat and pressure applying tool; and smoothing out the rough seam region with heat and pressure being applied by a heat and pressure applying tool to produce a flexible belt having a coating thereon, and a smooth welded seam without substantially removing any seam material; and then subsequently coating the seam and the entire member on from about 90 to about 100, from about 95 to about 100, and on 100 percent of its surface with a crosslinked resin mixture of a glycoluril resin and an acrylic resin; and an intermediate transfer member, such as an intermediate transfer belt, comprised of a seamed substrate, and wherein the substrate is coated with a crosslinked resin mixture of a glycoluril resin and a self crosslinking acrylic resin.

Embodiments illustrated herein also provide a process for the post treatment of an ultrasonically welded seamed flexible imaging member belt comprising providing a flexible belt having a first layer substrate, and at least one welded seam extending from one parallel edge to the other parallel edge, the welded seam having a rough seam region comprising an overlap of two opposite edges; positioning the flexible belt on a support like an anvil such that the flexible belt is held in position on the lower part of the anvil by a vacuum; contacting the first layer and the rough seam region with a heat and pressure applying tool, the heat and pressure applying tool being an ultrasonic vibrating horn, smoothing out the rough seam region with heat and pressure to produce a flexible belt having a smooth welded seam; and thereafter overcoating the entire member including the seam or seams with the resin mixture illustrated herein; and a process which comprises providing a flexible belt comprised of a substrate and two welded seams extending from one parallel edge to the other parallel edge of the belt, the welded seams having rough seam regions comprising an overlap of two opposite edges; positioning the flexible belt on a lower anvil such that the flexible belt is held in position on the lower anvil by a vacuum; contacting the rough seam region with a heat and pressure applying tool; and smoothing out the rough seam region with heat and pressure applied by the heat and pressure applying tool to produce a flexible belt having a smooth welded seam, and subsequently coating the entire belt and seams with the resin mixture illustrated herein.

DETAILED DESCRIPTION

Aspects of the present disclosure relate to a process which comprises providing a flexible belt having at least one welded seam extending from one parallel edge to the other parallel edge of the belt, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and an acrylic resin; an intermediate transfer member comprised of a supporting substrate, and wherein the substrate is coated with a crosslinked mixture of a glycoluril resin and an acrylic resin; an intermediate transfer belt comprised of a supporting substrate layer, and thereover a layer comprised of a mixture of a glycoluril resin and an acrylic resin; an intermediate transfer member comprised of a supporting substrate, and wherein the substrate is coated with a crosslinked mixture of a glycoluril resin and an acrylic resin; a process which comprises providing a flexible belt having no seam or at least one welded seam extending from one parallel edge to the other parallel edge of the belt, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam or seams, and subsequently coating the entire belt with a mixture of a glycoluril resin and a self crosslinking acrylic resin; an intermediate transfer member comprised of a seamed substrate, and wherein the entire 100 percent of the substrate is coated with a mixture of a known glycoluril polymer and a known acrylic polymer, and which known polymer mixture is crosslinked; a process which comprises providing a flexible photoconductor belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the substrate, inclusive of the seam or seams, with a mixture of a commercially available glycoluril resin and a commercially available crosslinked acrylic resin; and an intermediate transfer member comprised of a double seamed substrate, and wherein the substrate inclusive of the seams are coated with a crosslinked mixture of a glycoluril resin and an acrylic resin, wherein the glycoluril resin is represented by the formulas/structures illustrated herein; an intermediate transfer member comprised of a suitable known supporting substrate, and coated thereover a mixture of a glycoluril resin and an acrylic resin; an intermediate transfer belt comprised of a substrate with a double seam, and wherein the substrate and the seams are coated on from 95 to 100 percent of its surface area with a mixture of a glycoluril resin and an acrylic resin; and a polymeric mixture coated member inclusive of flexible belts, fuser belts, pressure belts, intermediate transfer belts, transfuse belts, transport belts, developer belts, photoreceptor belts, and the like where the polymeric coating top layer is comprised of a glycoluril resin and an acrylic resin.

The supporting substrate, which contains in embodiments at least one seam, is coated with a mixture of the crosslinked resins illustrated herein by a number of processes, such as a process which forms a strength enhancing bond between voids of mutually mating elements. The strength enhancing bond may comprise a material which is chemically and physically compatible with the material of the coating layer or layers of the belt. The resin coated welded seam or double seam has a smooth surface topology, as determined by the hand touching thereof, to thereby improve both the cleaning life of the cleaning blade, and the overall service life of the flexible belt. More specifically, embodiments disclosed herein relate to a post treatment process for efficiently and consistently smoothing an ultrasonically welded mixture of a glycoluril resin, and a self crosslinking acrylic resin coated overlap seam of a flexible belt that does not degrade seam strength, and where the coating is mechanically robust, and electrically is equal to or about equal to the surface resistivity of the seamed belt.

Examples of the glycoluril resins are, for example, represented by the following formula/structure

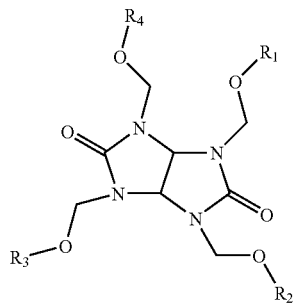

wherein each R substituent independently represents at least one of a hydrogen atom, and an alkyl with, for example, from 1 to about 18, from 1 to about 10, from 1 to about 8, or from 1 to about 4 carbon atoms.

Examples of the glycoluril resin include unalkylated and highly alkylated glycoluril resins like CYMEL®, and POWDERLINK® glycoluril resins commercially available from CYTEC Industries, Inc. Specific examples of the disclosed glycoluril resin include CYMEL® 1170 (a highly butylated resin with at least 75 percent of the R groups being butyl with the remainder of the R groups being hydrogen; viscosity equal to about 3,000 to about 6,000 centipoise at 23° C.); CYMEL® 1171 (a highly methylated-ethylated with at least 75 percent of the R groups being methyl/ethyl and the remainder of the R groups being hydrogen, viscosity equal to about 3,800 to about 7,500 centipoise at 23° C.); CYMEL® 1172 (an unalkylated resin with the R groups being hydrogen); and POWDERLINK® 1174 (a highly methylated resin with at least 75 percent of the R groups being methyl and the remainder of the R groups being hydrogen; a solid at 23° C.).

The number average molecular weight of the glycoluril resin is, for example, from about 200 to about 1,000, or from about 250 to about 600. The weight average molecular weight of the glycoluril resin is, for example, from about 230 to about 3,000, or from about 280 to about 1,800.

Examples of the selected acrylic resin, and more specifically, a self crosslinked acrylic resin, that is for example, where a crosslinking component is avoided, include the resin DORESCO® TA22-8, available from Lubrizol Dock Resins, Linden, N.J., and substantially free of any conductive components dispersed within. By the addition of a small amount of an acid catalyst, the acrylic resin self crosslinks upon thermal curing at temperatures of, for example, from about 80° C. to about 200° C. for a suitable time period, such as for example, from about 1 to about 60 minutes, and more specifically, curing at about 160° C. for 20 minutes, resulting in a mechanically robust crosslinked acrylic resin with a surface resistivity of, for example, from about $10^9$ to about $10^{13}$ ohm/sq, and specifically about $10^{11}$ ohm/sq. While the percentage of crosslinking can be difficult to determine, and not being desired to be limited by theory, the self crosslinking acrylic resin layer is crosslinked to a suitable value, such as for example, from about 30 to about 100 percent, from about 50 to about 95 percent, from about 50 to about 90, from about 50 to about 75, and the like.

In embodiments, examples of the acrylic resin selected for the coating mixture have, for example, a weight average molecular weight ($M_w$) of from about 100,000 to about 500,000, or from about 120,000 to about 200,000; a polydispersity index (PDI) ($M_w/M_n$) of from about 1.5 to about 4, or from about 2 to about 3; and a surface resistivity (at, for example, 20° C. and 50 percent humidity) of from about $10^8$ to about $10^{14}$ ohm/sq, or from about $10^9$ to about $10^{12}$ ohm/sq. A specific example of a self crosslinking acrylic resin selected for coating the intermediate transfer member includes DORESCO® TA22-8, 30 weight percent solids, and a glass transition temperature of about 79° C., as obtained from Lubrizol Dock Resins, Linden, N.J., which resin in one form possesses, it is believed, a weight average molecular weight of about 160,000, a polydispersity index of about 2.3, and a bulk resistivity (20° C. and 50 percent humidity) of about $10^{11}$ ohm/sq. Also, the acrylic resin selected for coating the seam, and the entire member containing the seam includes DORESCO® TA22-51, obtained from Lubrizol Dock Resins, Linden, N.J., which resin possesses lower crosslinking density upon thermal cure as compared to DORESCO® TA22-8 resin.

By the addition of a small amount of an acid catalyst, the mixture of the glycoluril resin and the acrylic resin crosslinks upon thermal curing at temperatures of, for example, from about 80° C. to about 200° C. for a suitable time period, such as for example, from about 1 to about 60 minutes, and more specifically, curing at about 160° C. for 20 minutes, resulting in a mechanically robust mixture of a crosslinked glycoluril resin and acrylic resin layer with a surface resistivity, for example, of from about $10^9$ to about $10^{13}$ ohm/sq, and specifically about $10^{11}$ ohm/sq. While the percentage of crosslinking can be difficult to determine, and not being desired to be limited by theory, the mixture of the glycoluril resin and the crosslinked resin layer is crosslinked to a suitable value as illustrated herein, such as for example, from about 30 to about 100 percent, or from about 50 to about 95 percent.

The thickness of the overcoating comprised of the mixture of a glycoluril resin and the resin is, for example, from about 1 to about 50 microns, from about 3 to about 30 microns, or from about 5 to about 15 microns.

Self crosslinking acrylic resin refers, for example, to this resin being crosslinked simply by heating, and in embodiments, where a catalyst can be selected to assist in the crosslinking. In addition, the glycoluril and acrylic resin mixture crosslinks, especially in the presence of a catalyst.

The circumference of the transfer member in a film or belt configuration of from 1 to 2, or more layers is, for example, from about 250 to about 2,500 millimeters, from about 1,500 to about 2,500 millimeters, or from about 2,000 to about 2,200 millimeters. The width of the film or belt is, for example, from about 100 to about 1,000 millimeters, from about 200 to about 500 millimeters, or from about 300 to about 400 millimeters. The thickness of the film or belt is, for example, from about 25 to about 500 microns, or from about 50 to 150 microns.

Nonlimiting examples of catalysts selected to aid in the crosslinking of the polymeric mixture of a glycoluril resin and the acrylic resin include oxalic acid, maleic acid, carboxylic acid, ascorbic acid, malonic acid, succinic acid, tartaric acid, citric acid, p-toluenesulfonic acid, methanesulfonic acid, and the like, and mixtures thereof. A typical concentration of the acid catalyst selected is, for example, from about 0.01 to about 5 weight percent, about 0.5 to about 4 weight percent, and about 1 to about 3 weight percent based on the weight of the mixture of a glycoluril resin and the acrylic resin.

A blocking agent can also be included in the crosslinked resin mixture layer, which agent can "tie up" or substantially block the acid catalyst effect to provide solution stability until the acid catalyst function is initiated. Thus, for example, the blocking agent can block the acid effect until the solution temperature is raised above a threshold temperature. For example, blocking agents can be used to block the acid effect until the solution temperature is raised above about 100° C. At that time, the blocking agent dissociates from the acid and vaporizes. The unassociated acid is then free to catalyze the polymerization. Examples of such suitable blocking agents include, but are not limited to, pyridine and commercial acid solutions containing blocking agents, such as CYCAT® 4045, available from Cytec Industries Inc.

The disclosed substrate containing a seam or doubled seam, and where the resulting dual layer member is overcoated with the mixture of resins illustrated herein further optionally includes in the overcoat a siloxane component or a fluoro component each present in an amount of, for example, from about 0.1 to about 20 weight percent, or from about 0.5 to about 5 weight percent, which component can be co-crosslinked with the resin mixture, and thereby provide an overcoat with excellent slippery characteristics.

Examples of the siloxane component include hydroxyl derivatives of silicone modified polyacrylates such as BYK-SILCLEAN® 3700; polyether modified acryl polydimethylsiloxanes such as BYK-SILCLEAN® 3710; and polyether modified hydroxyl polydimethylsiloxanes such as BYK-SILCLEAN® 3720.

Examples of the fluoro component include (1) hydroxyl derivatives of perfluoropolyoxyalkanes such as FLUOROLINK® D (M.W. of about 1,000 and a fluorine content of about 62 percent); FLUOROLINK® D10-H (M.W. of about 700 and fluorine content of about 61 percent); FLUOROLINK® D10 (M.W. of about 500 and fluorine content of about 60 percent) (functional group —$CH_2OH$); FLUOROLINK® E (M.W. of about 1,000 and a fluorine content of about 58 percent), FLUOROLINK® E10 (M.W. of about 500 and fluorine content of about 56 percent) (functional group —$CH_2(OCH_2CH_2)_nOH$); FLUOROLINK® T (M.W. of about 550 and fluorine content of about 58 percent), and FLUOROLINK® T10 (M.W. of about 330 and fluorine content of about 55 percent) (functional group —$CH_2OCH_2CH(OH)CH_2OH$); (2) hydroxyl derivatives of perfluoroalkanes ($R_fCH_2CH_2OH$, wherein $R_f$=$F(CF_2CF_2)_n$) wherein n represents the number of groups, such as about 1 to about 50, such as ZONYL® BA (M.W. of about 460 and fluorine content of about 71 percent), ZONYL® BA-L (M.W. of about 440 and fluorine content of about 70 percent), ZONYL® BA-LD (M.W. of about 420 and fluorine content of about 70 percent), and ZONYL® BA-N (M.W. of about 530 and fluorine content of about 71 percent); (3) carboxylic acid derivatives of fluoropolyethers such as FLUOROLINK® C (M.W. of about 1,000 and fluorine content of about 61 percent); (4) carboxylic ester derivatives of fluoropolyethers such as FLUOROLINK® L (M.W. of about 1,000 and fluorine content of about 60 percent), FLUOROLINK® L10 (M.W. of about 500 and fluorine content of about 58 percent); (5) carboxylic ester derivatives of perfluoroalkanes ($R_fCH_2CH_2O(C$=$O)R$ wherein $R_f$=$F(CF_2CF_2)_n$, n is as illustrated herein, and R is alkyl) such as ZONYL® TA-N (fluoroalkyl acrylate, R=$CH_2$=$CH$—, M.W. of about 570, and fluorine content of about 64 percent), ZONYL® TM (fluoroalkyl methacrylate, R=$CH_2$=$C(CH_3)$—, M.W. of about 530, and fluorine content of about 60 percent), ZONYL® FTS (fluoroalkyl stearate, R=$C_{17}H_{35}$—, M.W. of about 700, and fluorine content of about 47 percent), ZONYL® TBC (fluoroalkyl citrate, M.W. of about 1,560, and fluorine content of about 63 percent); (6) sulfonic acid derivatives of perfluoroalkanes $(R_fCH_2CH_2 SO_3H$, wherein $R_f=F(CF_2CF_2)_n$, n is as illustrated herein), such as ZONYL® TBS (M.W. of about 530 and fluorine content of about 62 percent); (7) ethoxysilane derivatives of fluoropolyethers such as FLUOROLINK® S10 (M.W. of about 1,750 to about 1,950); and (8) phosphate derivatives of fluoropolyethers such as FLUOROLINK® F10 (M.W. of about 2,400 to about 3,100). The FLUOROLINK® additives are available from Ausimont USA, and the ZONYL® additives are available from E.I. DuPont.

Examples of additional optional components present in the disclosed overcoat include a number of known conductive components, such as polyaniline, carbon black, or a metal oxide, each present in an amount of from about 0.1 to about 60 weight percent, from about 1 to about 30 weight percent, or from about 3 to about 15 weight percent.

In embodiments, the polyaniline component selected has, in embodiments, a relatively small particle size of, for example, from about 0.5 to about 5 microns, from about 1.1 to about 2.3 microns, from about 1.2 to about 2 microns, from about 1.5 to about 1.9 microns, or about 1.7 microns. Specific examples of polyanilines selected for the seam overcoat are PANIPOL™ F, commercially available from Panipol Oy, Finland; and lignosulfonic acid grafted polyaniline.

Examples of carbon blacks selected as the conductive component include VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN ® XC72R (fluffy form of VULCAN® XC72), VULCAN® XC605, VULCAN® XC305, REGAL® 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); channel carbon blacks available from Evonik-Degussa. Specific examples of conductive carbon blacks are Special Black 4 (B.E.T. surface area=180 $m^2/g$, DBP absorption=1.8 ml/g, primary particle diameter=25 nanometers), Special Black 5 (B.E.T. surface area=240 $m^2/g$, DBP absorption=1.41 ml/g, primary particle diameter=20 nanometers), Color Black FW1 (B.E.T. surface area=320 $m^2/g$, DBP absorption=2.89 ml/g, primary particle diameter=13 nanometers), Color Black FW2 (B.E.T. surface area=460 $m^2/g$, DBP absorption=4.82 ml/g, primary particle diameter=13 nanometers), and Color Black FW200 (B.E.T. surface area=460 $m^2/g$, DBP absorption=4.6 ml/g, primary particle diameter=13 nanometers).

Examples of metal oxides selected include tin oxide, antimony doped tin oxide, indium oxide, indium tin oxide, zinc oxide, and titanium oxide.

Adhesive layer component examples selected for the plural layered members, and which adhesive layer is usually situated between the supporting substrate and the top overcoat crosslinked resin mixture layer thereover, include for example, a number of resins or polymers of epoxy, urethane, silicone, polyester, and the like. Generally, the adhesive layer is a solventless layer, that is, materials that are liquid at room temperature (about 25° C.) and are able to crosslink to an elastic or rigid film to adhere at least two materials together. Specific examples of adhesives include 100 percent solids adhesives including polyurethane adhesives obtained from Lord Corporation, Erie, Pa., such as TYCEL® 7924 (viscosity from about 1,400 to about 2,000 cps), TYCEL® 7975 (viscosity from about 1,200 to about 1,600 cps), and TYCEL® 7276. The viscosity range of the adhesives is, for example, from about 1,200 to about 2,000 cps. The solventless adhesives can be activated with either heat, room temperature curing, moisture curing, ultraviolet radiation, infrared radiation, electron beam curing, or any other known technique. The adhesive layer thickness is, for example, from about 1 to about 100 nanometers, from about 5 to about 75 nanometers, or from about 50 to about 100 nanometers.

The end marginal regions of the transfer member can be joined by any suitable means including gluing, taping, stapling, pressure, and heat fusing to form a continuous member such as a belt, sleeve, or cylinder. Both heat and pressure can be used to bond the end marginal regions into a seam in the overlap region. The flexible member is thus transformed from a sheet of an intermediate transfer material into a continuous intermediate transfer belt. The flexible member has a first exterior major surface or side, and a second exterior major surface or side on the opposite side. The seam joins the flexible member so that the bottom surface, generally including at least one layer immediately above, at and/or near the first end marginal region, is integral with the top surface, generally including at least one layer immediately below, at and/or near the second end marginal region.

A heat and pressure seam joining means includes ultrasonic welding to transform the sheet of an intermediate transfer material into an intermediate transfer belt. The belt can be fabricated by ultrasonic welding of the overlapped opposite end regions of a sheet.

Ultrasonic welding is selected, in embodiment, for joining the flexible intermediate transfer member because it is rapid, clean and solvent free, and of low cost, and it produces a thin and narrow seam. In addition, ultrasonic welding is selected since the mechanical high frequency pounding of the welding horn causes the generation of heat at the contiguous overlapping end marginal regions of the flexible imaging sheet loop to maximize melting of one or more layers therein to form a strong and precisely defined seam joint. For example, ultrasonic welding, and an apparatus for performing the same is disclosed in U.S. Pat. No. 4,532,166, the disclosure of which is totally incorporated herein by reference.

In a specific embodiment, the heat and pressure applying tool is an ultrasonic vibrating horn. In such an embodiment, the lower anvil selected may be a flat anvil. The tool smoothes out the rough seam region by proceeding with a second welding pass across the welded region such that the rough seam region is further compressed under high pressure and heat. Since the post treatment smoothing process uses the welding horn to further compress the overlap, rather than removing the protruding material, seam strength is not substantially degraded. Moreover, the welded seam may be double welded from the back side of the seam as well. In such embodiments, the second welding pass is accomplished with the seam inverted on the anvil so that the imaging side of the belt is facing down on the anvil. In this manner, the overlap on the image side of the belt can be substantially eliminated as it conforms to the smooth surface of the anvil.

The heat and pressure applying tool is, in embodiments, an automated heated pressure roller or a heated upper anvil. In these embodiments, the lower anvil is a round anvil, and an edge of the seam region is positioned on an apex of the lower anvil, and where a smooth seam with no protrusion results by traversing the automated heated pressure roller along the seam to reform the edge of the seam region. The heated pressure roller applies pressure on the welded seam against the lower anvil while heating the seam such that a smooth welded seam is produced with the belt held in place by a vacuum on the lower anvil while the heated pressure roller traverses the seam. To effectively heat roll the seam smooth, the roller to the seam is positioned so as to be located on the apex of the anvil to fully expose the area to be smoothed. The surface of the roller should be tangent to the anvil's apex. Using a round anvil allows heat and pressure to be concentrated along the edge of the overlap. In further embodiments, the heated pressure roller is used in an automated system where the heated roller is affixed to a linear actuator which drives it tangent to the roller's apex along its length. Temperature may be controlled by means of a thermostat controller while pressure may be controlled by spring tension.

By applying the heated upper anvil to the edge of the seam region, where the welded seam is sandwiched between the upper and lower anvils, the welded seam is thus compressed under high pressure. Both the upper and lower anvils may be heated so that during the compression, the seam material is also heated close to its glass transition temperature to further facilitate the reformation of the welded seam, and to produce a smooth welded seam. The upper and lower anvils may be heated by heating components embedded in the upper and lower anvils, and which are controlled by a thermostatic controller. In this embodiment, the welded seam may be reduced in seam thickness by from about 25 percent to about 35 percent.

The following Examples are provided.

COMPARATIVE EXAMPLE 1

A seamed intermediate transfer belt (ITB) was prepared as follows. A 76.2 micron intermediate transfer sheet comprised of a first layer substrate comprised of a mixture of 91 weight percent of KAPTON® KJ (available from E.I. DuPont), and 9 weight percent of polyaniline (1.7 microns in diameter size) was cut to a size of 362 millimeters wide by 2,210.8 millimeters long. The ends were overlapped by 250 microns, and an ultrasonic horn was used to compress the above mixture against a steel welding platen, melting the mixture in the overlap region, and creating a seam. The seam was then reverse welded, resulting in a seamed ITB with a reverse double welded seam of about 100 microns thick.

The surface resistivity of the above formed ITB was measured using a High Resistivity Meter (Hiresta-Up MCP-HT450 obtained from Mitsubishi Chemical Corp., under 1,000 V, averaging four measurements at varying spots, 72° F./65 percent room humidity), and where the surface resistivity was about $1 \times 10^{10}$ ohm/sq.

EXAMPLE I

Comparative Example 1 entire ITB, including the seam, was overcoated (overcoat layer) by a known flow coating method. The overcoat layer coating solution was prepared by introducing into an amber glass bottle in a weight ratio of 34/63/2/1 CYMEL® 1170, a highly methylated-ethylated glycoluril resin, represented by

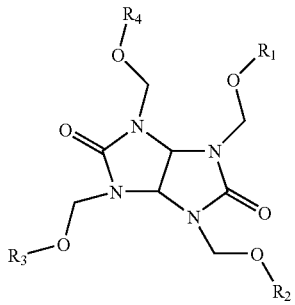

with at least 75 percent of the R groups being methyl/ethyl, and the remainder of the R groups being hydrogen, and with a viscosity of from about 3,800 to about 7,500 centipoises at 23° C., commercially available from CYTEC Industries, Inc; DORESCO® TA22-8, a self crosslinking acrylic resin solution in ethanol/acetone (about 30 weight percent solid) obtained from Lubrizol Dock Resins, and with a resin glass transition temperature of 79° C.; p-toluenesulfonic acid (pTSA), an acid catalyst; and SILCLEAN® 3700, a hydroxyl derivative of a silicone modified polyacrylate obtained from BYK, Inc. The resulting mixture was then dissolved in DOWANOL™ to form a solution containing about 15 percent by weight solids.

The above resulting overcoat layer was crosslinked upon thermal curing at 160° C. for 20 minutes, resulting in a 20 micron thick mechanically robust polymeric layer on the seam comprised of CYMEL® 1170/DORESCO® TA22-8/pTSA/SILCLEAN® 3700 in a ratio of 34/63/2/1 with a surface resistivity of about $3.1 \times 10^9$ ohm/sq.

The overcoated belt of Example I and the noncoated seamed ITB of Comparative Example 1 were print tested on a Xerox Corporation DC5000 printer. After 100 prints, full page image quality analysis of 50 percent of the halftone images was visually evaluated, especially around the overcoated seam areas. The seam printout was invisible for the overcoated belt of Example I whereas the seam was visible for the nonovercoated belt of Comparative Example 1.

The above data demonstrates that the Example I overcoated imageable dual layer ITB had the advantages indicated and where, for example, the seam was invisible for 100 xerographic prints, while for the Comparative Example 1 ITB with a noncoated seam, the seam was visible for each of the 100 xerographic prints. The glycoluril resin/acrylic resin of Example I overcoated ITB was mechanically robust, and the seamed region remained invisible for 400,000 prints in contrast to the Comparative Example 1 ITB where the seamed region was visible beginning with the first print, and remained visible for 400,000 prints.

EXAMPLE II

The above process of Example I is repeated except that the overcoat layer on the belt is comprised of CYMEL® 1170/DORESCO® TA22-8/pTSA/SILCLEAN® 3700 in a ratio of 29.1/67.9/2/1, and which overcoat layer had a surface resistivity of about $1.1 \times 10^{10}$ ohm/sq.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a supporting substrate, a crosslinked coating of a mixture of a glycoluril resin, an acrylic resin, an optional conductive component, an optional polymer, an optional siloxane component, and an optional fluoro component, and further consisting of an optional adhesive layer between the substrate and the coating and an optional release layer over the coating.

2. An intermediate transfer member in accordance with claim 1 wherein said conductive component is selected from the group consisting of carbon black, a polyaniline and a metal oxide, and wherein said polymer is selected from a group consisting of a polyimide, a polycarbonate, a polyamideimide, a polyphenylene sulfide, a polyamide, a polysulfone, a polyetherimide, a polyester, a polyvinylidene fluoride, a polyethylene-co-polytetrafluoroethylene, and mixtures thereof, and said crosslinked is from about 55 to about 95 percent, and said substrate is coated on from about 90 to about 100 percent of its surface.

3. An intermediate transfer member in accordance with claim 2 wherein said conductive component is carbon black, and said polymer is a polyimide, and said member includes at least one seam.

4. An intermediate transfer member in accordance with claim 1 wherein said conductive component is selected of carbon black or a polyaniline, and said polymer is selected from a group consisting of a polyimide, a polycarbonate, a polyamideimide, a polyphenylene sulfide, a polyamide, a polysulfone, a polyetherimide, a polyester copolymer, a polyvinylidene fluoride, or a polyethylene-co-polytetrafluoroethylene, and wherein said belt includes one seam or two seams.

5. An intermediate transfer member in accordance with claim 1 wherein said mixture of said glycoluril resin and said acrylic resin contains from about 1 to about 99 weight percent of said glycoluril resin, and about from 99 to about 1 weight percent of said acrylic resin, and wherein the total solids thereof is about 100 percent.

6. An intermediate transfer member in accordance with claim 1 wherein said mixture of said glycoluril resin and said acrylic resin contains from about 55 to about 85 weight percent of said glycoluril resin, and from 45 to about 15 weight percent of said acrylic resin, and wherein the total solids thereof is about 100 percent.

7. An intermediate transfer member in accordance with claim 1 wherein said glycoluril resin is represented by

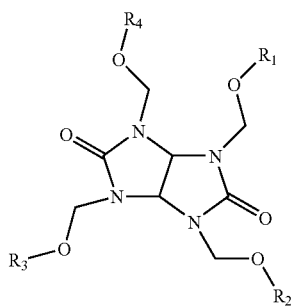

wherein each R group is at least one of hydrogen and alkyl.

8. An intermediate transfer member in accordance with claim 7 wherein said glycoluril resin possesses a number average molecular weight of from about 200 to about 1,000, and a weight average molecular weight of from about 230 to about 3,000, and each R group is alkyl with from about 1 to about 4 carbon atoms.

9. An intermediate transfer member in accordance with claim 7 wherein said glycoluril resin possesses a number average molecular weight of from about 250 to about 600, and a weight average molecular weight of from about 280 to about 1,800, and each R is n-butyl, isobutyl, methyl, or ethyl.

10. An intermediate transfer member in accordance with claim 7 wherein each of said R groups is hydrogen.

11. An intermediate transfer member in accordance with claim 7 wherein each of said R groups is alkyl with from 1 to about 10 carbon atoms, and said crosslinked is from about 50 to about 95 percent.

12. An intermediate transfer belt in accordance with claim 7 wherein said glycoluril resin is a butylated glycoluril formaldehyde resin present in an amount of from about 50 to about 90 weight percent, and said acrylic resin is a self crosslinking acrylic resin present in an amount of from about 50 to about 10 weight percent, wherein the total solids thereof is about 100 percent, and said crosslinked is from about 50 to about 90 percent.

13. An intermediate transfer member in accordance with claim 1 wherein said acrylic resin possesses a bulk resistivity of from about $10^8$ to about $10^{14}$ ohm/sq.

14. An intermediate transfer member in accordance with claim 1 wherein said acrylic resin possesses a bulk resistivity, at about 20° C. and at about 50 percent relative humidity, of from about $10^9$ to about $10^{12}$ ohm/sq.

15. An intermediate transfer member in accordance with claim 1 wherein said acrylic resin possesses a weight average molecular weight ($M_w$) of from about 100,000 to about 500,000, and a polydispersity index (PDI) ($M_w/M_n$) of from about 1.5 to about 4.

16. An intermediate transfer member in accordance with claim 1 wherein said acrylic resin possesses a weight average molecular weight ($M_w$) of from about 120,000 to about 200,000, and a polydispersity index (PDI) ($M_w/M_n$) of from about 2 to about 3.

17. An intermediate transfer member in accordance with claim 1 wherein said adhesive layer is situated between said substrate and said glycoluril resin/acrylic resin mixture, and wherein said adhesive layer is of a thickness of from about 1 to about 100 nanometers, and wherein said adhesive layer is an epoxy, a urethane, a silicone, or a polyester.

18. An intermediate transfer member in accordance with claim 1 wherein said mixture of said glycoluril resin and said acrylic resin acid catalyst is selected in an amount of from about 0.1 to about 3 weight percent, said siloxane component, or a said fluoro component is present, each selected in an amount of from about 0.1 to about 5 weight percent.

19. An intermediate transfer member in accordance with claim 18 wherein said acid catalyst is a toluenesulfonic acid; said siloxane component is a hydroxyl derivative of a silicone modified polyacrylate, a polyether modified acryl polydimethyl siloxane, a polyether modified hydroxyl polydimethyl siloxane, or an alkoxysilane comprised of at least one alkoxy group bonding to at least one silicon atom, and said alkoxy is methoxy, ethoxy, n-propoxy, isopropoxy, n-butoxy, or isobutoxy; and said fluoro component is at least one of a hydroxyl derivatives of a perfluoropolyoxyalkane; a hydroxyl derivative of a perfluoroalkane; a carboxylic acid derivative of a fluoropolyether; a carboxylic ester derivative of a fluoropolyether; a carboxylic ester derivative of a perfluoroalkanes; a sulfonic acid derivative of a perfluoroalkane; silane derivative of a fluoropolyether; and a phosphate derivative of a fluoropolyether.

20. An intermediate transfer member in accordance with claim 1 wherein said release layer is positioned on said crosslinked mixture, which mixture is in the form of a layer.

21. An intermediate transfer member in accordance with claim 20 wherein said release layer is a polyfluorinated ethylene propylene copolymer, a polytetrafluoroethylene, a polyfluoroalkoxy polytetrafluoroethylene, a polyfluorosilicone, a polymer of vinylidenefluoride, hexafluoropropylene and tetrafluoroethylene, and mixtures thereof.

22. An intermediate transfer belt consisting of a supporting substrate layer, and thereover a layer consisting of a mixture of a glycoluril resin and an acrylic resin, containing from about 55 to about 85 weight percent of said glycoluril resin, and from 45 to about 15 weight percent of said acrylic resin, and wherein the total solids thereof is about 100 percent, and an optional catalyst.

23. An intermediate transfer belt in accordance with claim 22 wherein said substrate contains at least one seam, and where prior to applying said mixture to said substrate the at least one seam possesses a roughened surface, and subsequent to said applying the seamed areas are smooth, and wherein said mixture is crosslinked at a percentage of from about 30 to about 100.

24. An intermediate transfer belt in accordance with claim 22 wherein wherein said catalyst is present, and wherein said mixture is crosslinked at from about 50 to about 95 percent.

* * * * *